United States Patent Office 3,133,889
Patented May 19, 1964

3,133,889
MEMBRANE MANUFACTURE
Jan F. A. Hazenberg, Pijnacker, and Borgert P. Knol, Haren, Netherlands, assignors, by mesne assignments, to American Machine & Foundry Company, a corporation of New Jersey
No Drawing. Continuation of application Ser. No. 738,019, May 27, 1958. This application Sept. 22, 1961, Ser. No. 139,886
Claims priority, application Netherlands June 3, 1957
29 Claims. (Cl. 260—2.1)

Selective membranes have the property of being permeable to ions of positive (negative) sign and being not or less permeable to ions of negative (positive) sign. They are extensively used in electrodialysis processes and in general in processes for separating ions by means of an electric current passing through a series of chambers bordered by selective membranes. Such processes include the removal of mineral constituents from an aqueous solution such as desalting water, purification of industrial liquids such as sugar syrup, removal of salt constituents from milk and whey, hydrolyzing salts of weak acids or weak bases, double decomposition of salts. These membranes may also be used in measuring devices such as potentiometers and the like.

One method of preparing such membranes is described in the British patent specification 778,001 according to which a sheet of an organic high-molecular hydrophobic material is chemically treated in such a manner that the resulting product contains ionic groups.

The starting materials known thus far for use in such a process show certain disadvantages. In many cases the products are rather brittle or at any rate mechanically not perfect; during the subsequent reactions necessary for introducing ionic groups complications may arise, etc.

The present invention is especially concerned with methods for obtaining a more satisfactory starting material for processes of such a type.

Although the invention will be described with respect to materials in sheet form it should be noted that in its broader aspects the invention also covers materials in other forms suitable for use in such processes as separating ions with the aid of an electric field, such as electrodialysis processes, for instance materials in the form of tubes, beakers, plates, rods and the like.

This invention concerns: the manufacture of ion exchange material; ion exchange materials, particularly membranes, made by the process of the invention; and use of said materials for segregating ions in a fluid by contacting ion bearing fluid with materials made by the process of the invention. The invention includes a process for the production of ion exchange materials, particularly membranes, which comprises contacting a solid carrier polymer, such as polyethylene, and a vinyl aromatic monomer, such as styrene, until the liquid monomer is absorbed within the solid carrier polymer, polymerizing the monomer by thermal treatment above room temperature and below the softening temperature of the carrier polymer in the presence of a free radical producing polymerization catalyst and thereafter introducing ion exchange groups into the composite polymeric product.

According to the invention an excellent starting material for use in processes by which ionic groups are introduced in the material, thus leading to selective membranes, may be obtained by swelling a sheet, tube or the like of a poly alkylenic material such as polyethylene or polypropylene in a liquid aromatic vinylic monomer such as styrene or ortho- and para-vinyl toluene and subjecting the swollen sheet or the like to a polymerizing treatment.

An embodiment of the invention viz a polyethylene sheet swollen in monomeric styrene will now be described by way of example.

It should be noted that data as to temperature, time, degree of swelling etc. are not invariable but depend more or less on the thickness of the sheet, the intrinsic viscosity of the polyethylene, etc.

The equilibrium during the swelling stage is soon reached. In a given case it was established that with a sheet of 100 microns thickness this equilibrium was reached within 15–20 minutes at 60° C.; if the sheet was kept longer in the monomeric styrene, no further swelling was observed. The temperature during the swelling stage is of influence especially with respect to the time required for complete swelling but it should be noted that the temperature is limited by the point at which the sheet completely dissolves in the styrene.

In the above-mentioned case the sheet took up 20–40 grams of styrene per 100 grams of polyethylene. This amount slightly depends on the thickness and the nature (intrinsic viscosity; manufacture history) of the polyethylene sheet. The same applies to the so-called polyethylene-extraction. Not only does swelling of the polyethylene in the styrene occur but also some of the polyethylene may dissolve away during the swelling stage. If $a$ grams of polyethylene are swollen in styrene and then the styrene is removed by evaporation in vacuum at an elevated temperature (in Table I the results are given for keeping it 16 hours in vacuum at 80° C.), the polyethylene sheet weighs $b$ grams. The ratio $a-b \times 100$ is called the polyethylene extraction; it amounts to about 0.2–3 percent. It should be observed that substantially all of the styrene is already removed long before 16 hours.

In Table I some results are recorded of the styrene absorption in a number of experiments. By the term absorption is meant that monomeric styrene which is taken up by the polyethylene in any way.

TABLE I

| Polyethylene | | | | Swelling | | | |
|---|---|---|---|---|---|---|---|
| Type | Thickness in microns | Intrinsic viscosity | Duration in minutes | Temp., °C. | Absorption measured | Polyethylene extraction | Absorption corrected |
| S | 100 | 1.10 | 120 | 20 | 11 | 0.2 | 11.2 |
|  | 100 | 1.10 | 60 | 40 | 21 | 1.0 | 22.0 |
|  | 100 | 1.10 | 15–20 | 60 | 28 | 2.1 | 30.1 |
|  | 100 | 1.10 |  | 70–75 | Film | dissolves |  |
| B.V. | 200 | 1.07 | 120 | 20 | 9.5 | 2.2 | 11.7 |
|  | 200 | 1.07 | 60 | 40 | 15 | 2.4 | 17.4 |
|  | 200 | 1.07 | 20 | 60 | 24 | 2.7 | 26.7 |
|  | 200 | 1.07 |  | 70–75 | Film | dissolves |  |
| P | 135 | 1.95 | 60 | 60 | 7.9 | 1.3 | 9.2 |
|  | 135 | 1.95 | 60 | 70 | 8.8 | 1.3 | 10.1 |
|  | 135 | 1.95 | 60 | 80 | 9.6 | 2.0 | 11.6 |
|  | 135 | 1.95 | 60 | 100 | 17 | 5.6 | 22.6 |
|  | 135 | 1.95 | 60 | 110 | Film | dissolves |  |

Type of polyethylene: S stands for high-pressure polyethylene (Sidac-Belgium); B.V. idem (British Visqueen-Great Britain); P for low-pressure polyethylene (Phillips-U.S.A.).

For S and B.V. the intrinsic viscosity was determined in Decalin at 70° C.; for P in Tetralin at 120° C.

The absorption as measured is given as the amount of styrene in percent by weight calculated on polyethylene.

The polyethylene-extraction was determined as described and is given in percent calculated on polyethylene.

The corrected absorption of styrene is the sum of the absorption of styrene as measured and the amount of extracted polyethylene and is given in percents calculated on polyethylene.

The variation in absorption was about one percent calculated on polyethylene. With a styrene-content of 25-30% this variation was consequently 6-7% calculated on the amount of styrene which was taken up. For an accurate determination of these values the sheet must be freed from adhering styrene e.g. with filter paper. In a technical process such a step of freeing from adhered styrene is not necessary although it may be desirable if an absolutely homogeneous membrane is to be obtained.

The styrene escapes very rapidly from the swollen sheet; after 15 minutes scarcely any styrene was still present in the film.

This phenomenon calls for certain measures during the subsequent heat treatment for polymerization. Some of these suitable measures are heating in a confined space e.g. between glass plates, heating in a vessel saturated with styrene vapour, etc. Excellent results were obtained on a technical scale by heating in an aqueous saturated salt solution; this will be discussed below.

A polymerization catalyst may be dissolved in the monomeric styrene; examples are peroxides such as benzoyl peroxide and substances such as N,N-azo-bis-isobutyro nitrile.

The same applies to cross-linking agents such as divinyl benzene.

The polymerization temperature depends on factors such as:

The softening temperature of the swollen polyalkylene e.g. polyethylene; this factor sets an upper temperature limit;

The duration of the polymerization step; too low a temperature leads to a duration which is too long for a technical process;

The equilibrium of the swelling process which is the sooner established the higher the temperature.

Temperatures in the order of 60-110° C. are normal.

If the polymerization is carried out between glass plates difficulties may arise if the sheet is to be removed after polymerization; these difficulties can be prevented by such measures as placing talcum powder on the glass plates before polymerizing the swollen sheet, dissolving zinc stearate in the styrene (for instance 0.1% by weight), placing zinc stearate on the glass, covering the glass with cellophane and the like.

Heating the swollen sheet in water is not desirable, probably because some styrene dissolves in the water with the result that in the polymerized sheet less polystyrene is present than would correspond with the amount of monomeric styrene originally present in the swollen sheet.

Very good results are obtained, however when polymerizing by heating, with saturated solutions of electrolytes. Even with large amounts of polystyrene, the final sheets are of excellent quality and have a mechanical strength comparable to that of polyethylene itself. This is quite surprising because polystyrene is brittle, especially if cross-linkages are present. The surface of the final sheets is smooth and the sheets remain opaque or even transparent.

As electrolytes diverse salts may be used such as sodium chloride, ammonium chloride, calcium chloride, sodium sulphate, ammonium sulphate, aluminium sulphate.

In Example 1 the polymerization step will be illustrated.

*Example 1*

Sheets of high-pressure polyethylene (thickness 100 microns) with an intrinsic viscosity (Decalin at 70° C.) of 1.10 were swollen in monomeric styrene at 60° C. for 20 minutes. 2% by weight of divinyl benzene and 1% by weight of benzoylperoxide were dissolved in monomeric styrene. The swollen sheets contained 30.1% by weight of styrene.

The swollen sheet was kept in an aqueous saturated solution of sodium sulphate at 70° C. for 6 hours. Calculated on polyethylene the amount of polystyrene with various sheets was from 25 to 28%.

The conversion of such a sheet into membranes will be illustrated by Examples 2, 3 and 4.

*Example 2*

A sheet as prepared in Example 1 with a polystyrene content of 26.5% by weight calculated on polyethylene was kept in boiling chloromethyl methylether with tin tetrachloride as a catalyst for 4 hours. Determination of the chlorine content of the treated sheet indicated that there had been an almost quantitative reaction at the aromatic nuclei of the polystyrene component.

The sheet thus obtained was aminated by treating it with a solution of 25% of trimethyl amine in acetone at room temperature for 24 hours. Amination was almost quantitative as shown by nitrogen analysis.

The ohmic resistance of 1 sq. cm. of membrane thus prepared in 0.1 N sodium chloride solution in water at 20° C. was 4 ohms. The selectivity in 1 N/2 N potassium chloride in water was 85%. The capacity per gram of dry substance was 1.6 milliequivalents. The water content was 20%.

*Example 3*

A sheet as prepared in Example 1 with a polystyrene content of 26.5% by weight calculated on polyethylene was sulphonated by keeping it in a mixture of chlorosulphonic acid (75%) and carbon tetra chloride (25%) for 5 hours at room temperature. The membrane thus prepared had showed an ohmic resistance in 0.1 N NaCl of 9 ohms. If a mixture of 25% chlorosulphonic acid and 75% of carbon tetrachloride was used, the ohmic resistance was 11 ohms in 0.1 N NaCl.

In both cases the selectivity was good (82% in 1 N/2 N KCl); the capacity was 0.3 meq./g.

It is also possible to sulphonate with chlorosulphonic acid alone but this takes more time. After 18 hours an ohmic resistance of 8.5 ohms was found. In this case the membranes are generally somewhat more brittle than if the above-mentioned sulphonating mixture was used.

*Example 4*

A sheet with a thickness of 200 microns was swollen as described in styrene in which 4% by weight of divinyl benzene and 1% by weight of benzoyl peroxide were dissolved and then the swollen sheet was polymerized as indicated in Example 1. The polystyrene content was 25.2% by weight.

After having been kept for 9 hours in concentrated sulphuric acid (98.3%) at 100° C. to which 4 g. $HgCl_2$ per litre of acid were added, the product was placed in $H_2SO_4$ and then in water. The ohmic resistance of the membrane was 2.8 ohms in 0.1 N NaCl; the selectivity in 1 N/2 N KCl was 72% and the water content was 44%.

Thinner sheets took less time (in the order of 1-2 hours) for the sulphonating step.

In order to show the influence of some reaction conditions some further experiments are recorded below.

The sheets were of styrenized polyethylene of various thicknesses (150 to 250 microns), various types of polyethylene (Sidac-Belgium; Kalle-Germany; British Visqueen-Great Britain) were used according to Example 1 with varying amounts of divinyl benzene.

Example 5

Styrenized polyethylene sheets (27% polystyrene) with a thickness of 250 microns and with 4% divinylbenzene dissolved in the monomeric styrene were treated with sulphuric acid of varying strength at a temperature of 100° C. The original polyethylene was from Sidac.

A. With addition of oleum (with 10% $SO_3$) a sulphuric acid with a strength corresponding to 100.4% was obtained. After a treatment of 30 minutes the ohmic resistance of the sheets was still very high (1600 ohms) after 35 minutes' treatment sheets were obtained with an ohmic resistance of 7 ohms and having a good mechanical strength. After 50 minutes' treatment the sheets showed an ohmic resistance of 3 ohms but the products became somewhat brittle.

B. With sulphuric acid of 98.5% it took 2½ hours to obtain a membrane with an ohmic resistance of 7 ohms and a good mechanical strength.

C. With 95.6% sulphuric acid results were not satisfactory in this case.

Example 6

The product to be sulphonated was either identical to that of Example 5 or it was obtained by using 2% instead of 4% of divinylbenzene dissolved in the monomeric styrene. In the first case a good product was obtained (resistance 9 ohms) with $H_2SO_4$ 98.3% at 100° C. after 2½ hours; in the second case (2% divinyl benzene) it took about 2 hours of treatment with $H_2SO_4$ to reach an ohmic resistance of 5 ohms.

In general higher cross-linking means a somewhat longer sulphonation time.

Whereas with 95.6% sulphuric acid a product of the first type (4% divinyl benzene) could not be sulphonated satisfactorily, a product of the second type (2% divinyl benzene) gave a membrane with an ohmic resistance of about 5 ohms after 6 hours.

Experiments have been carried out with sulphuric acid containing a slight amount (in the order of 0.5% by weight) of silver nitrate.

This leads to considerable shorter sulphonating times than if no addition to the sulphuric acid was made and, moreover, the bath can be used for much longer times, always giving membranes of low ohmic resistance and good selectivity.

If the experiment mentioned in the last paragraph of Example 6 was repeated but with addition of 0.5% by weight of $AgNO_3$ to the sulphuric acid, after 1 hour a membrane with a resistance of 7 ohms was obtained, whereas after 1 hour in sulphuric acid without additives, in sulphuric acid of the same strength (95.6%) the ohmic resistance was much higher.

Comparison of some tests of sheets of the 4%-divinyl benzene type and of the 2%-divinyl benzene type showed that with sulphuric acid and 0.5% $AgNO_3$ after the same period of sulphonation the ohmic resistance of the membranes in the latter case is about half of that in the first case.

However, in the latter case the selectivity of the membranes in about 10–15% lower. The water content is somewhat higher.

These examples are given only to convey an idea of the influence of diverse factors. Slight variations will always be found, depending e.g. on the nature of the polyethylene used in the first stage and on the styrene content in the swollen sheet.

Not only polyethylene may be used but also polypropylene.

Compartive tests have been carried out by using Ziegler low pressure polyethylene, and two types of polypropylene viz. "Moplen A/2," and "Moplen M/2," both from Montecatini (Italy). The melting point of "Moplen A/2" was 170–172° C.; its chemical analysis 85.09% C, 14.24% H and 0.33% ash. The melting point of "Moplen M/2" was 167–169° C.; its chemical analysis 84.85% C., 14.17% H and 0.54% ash.

Swelling the sheet in monomer styrene was done by keeping the sheet for 15 minutes in the styrene. Results are recorded in Table II.

TABLE II

| Polyalkylene | | Swelling | | | |
|---|---|---|---|---|---|
| Type | Thickness microns | Intrinsic viscosity | Temp., ° C. | Absorption measured | Polyalkylene extraction | Absorption corrected |
| Z | 200 | 1.97 | 50 | 8.6 | 0.6 | 9.2 |
| Z | 200 | 1.97 | 60 | 11.2 | 0.8 | 12.0 |
| Z | 200 | 1.97 | 70 | 13.8 | 1.2 | 15.0 |
| Z | 200 | 1.97 | 80 | 18.0 | 2.4 | 20.4 |
| Z | 200 | 1.97 | 90 | 24.9 | 5.2 | 30.1 |
| A/2 | 105 | 4.21 | 50 | 12.4 | 0.4 | 12.8 |
| A/2 | 105 | 4.21 | 60 | 14.5 | 0.6 | 15.1 |
| A/2 | 105 | 4.21 | 70 | 17.8 | 0.6 | 18.4 |
| A/2 | 105 | 4.21 | 80 | 20.3 | 1.1 | 21.4 |
| M/2 | 90 | 3.12 | 50 | 15.4 | 2.9 | 18.3 |
| M/2 | 90 | 3.12 | 60 | 17.5 | 4.2 | 21.7 |
| M/2 | 90 | 3.12 | 70 | 19.7 | 6.0 | 25.7 |
| M/2 | 90 | 3.12 | 80 | 22.3 | 7.8 | 30.1 |

In this Table II Z stands for Ziegler polyethylene and A/2 and M/2 for Montecatini polypropylene.

The intrinsic viscosity for Z was measured in tetralin at 120° C.; for A/2 and M/2 in tetralin at 135° C. The extraction was determined as indicated with respect to Table I.

In order to establish the polymerization conditions sheets of Ziegler polyethylene were swollen in styrene at 70° C. and 80° C. for 15 minutes (experiments 1, 2 and 3 and 4, 5 and 6); the styrene contained 1% by weight of benzoyl peroxide and 2% by weight of divinyl benzene. The Montecatini polypropylene was swollen (both A/2 and M/2 for 15 minutes at 80° C. in styrene containing 1% by weight of benzoyl peroxide and 0.5% by weight of divinyl benzene (experiments 7–12).

Polymerization was carried out by keeping the swollen sheets in a saturated aqueous solution of sodium sulphate at 70° C. for 6 hours.

The results are given in Table III.

TABLE III

| Type polyalkylene | No. | P | $P_1$ | $S_1$ | O |
|---|---|---|---|---|---|
| Z | 1 | 10.9 | 12.1 | 15 | 80 |
| Z | 2 | 10.9 | 12.1 | 15 | 80 |
| Z | 3 | 11.6 | 12.8 | 15 | 85 |
| Z | 4 | 14.0 | 16.4 | 20.4 | 80 |
| Z | 5 | 13.9 | 16.3 | 20.4 | 80 |
| Z | 6 | 14.3 | 16.7 | 20.4 | 82 |
| A/2 | 7 | 16.4 | 17.5 | 21.4 | 81 |
| A/2 | 8 | 17.5 | 18.6 | 21.4 | 87 |
| A/2 | 9 | 18.5 | 19.6 | 21.4 | 91 |
| M/2 | 10 | 13.0 | 20.8 | 30.1 | 69 |
| M/2 | 11 | 14.0 | 21.8 | 30.1 | 72 |
| M/2 | 12 | 17.2 | 25.0 | 30.1 | 82 |

In this Table Z, A/2 and M/2 have the same meaning as in Table II.

P is the increase (in percent) of the weight of the polymerized sheet as compared with the weight of the polyalkylene sheet used as a starting material. $P_1$ is a value, obtained from P by adding to P the value of the polyalkylene extraction in percent calculated on polyalkylene; this term has been explained with reference to Table I. In experiments No. 1, 2 and 3 this percentage was 1.2 (see Table II for Z at 70° C.); in experiments No. 4, 5 and 6 it was 2.4 (see Table II for Z at 80° C.); in experiments No. 7, 8 and 9 it was 1.1 (see Table II for A/2 at 80° C.); in experiments No. 10, 11 and 12 it was 7.8 (see Table II for M/2 at 80° C.).

$S_1$ is the value of the "absorption corrected" as listed in Table II for Z (70° C.), Z (80° C.), A/2 (80° C.) and M/2 (80° C.).

O is the degree (in percent) to which polymerization has taken place with $$O = \frac{P_1 \times 100}{S_1}$$

Not only with the polyalkylenes recorded in Table III but also with other polyethylenes (e.g. high-pressure polyethylenes) O has always been found to be in the order of 80%; this means that of the monomeric styrene which was taken up during the swelling stage, 80% is polymerized (to polystyrene) in the final product.

Sulphonation was carried out with the sheets No. 6, 8 and 11 of Table III in sulphuric acid (95.6%), to which 0.2% by weight of silver nitrate had been added, at a temperature of 100° C. The sheets are indicated as Z-6, A/2-8 and M/2-11 respectively. In Table IV some results are given with respect to duration of sulphonation (time in hours), ohmic resistance of the membrane in 0.1 N NaCl, selectivity in 1 N/2 N KCl, water content in percent, sulphur analysis in percent and in milliequivalents.

TABLE IV

| Type | Time | Resistance | Selectivity | H₂O | S in percent | S in meq. |
|---|---|---|---|---|---|---|
| Z-6 | 5 | 14.9 | 88 | 22.0 | 3.88 | 1.20 |
| Z-6 | 6 | 12.6 | 88 | 26.0 | 4.23 | 1.32 |
| A/2-8 | 2½ | 5.3 | 77 | 41 | 3.73 | 1.16 |
| M/2-11 | 2½ | 3.0 | 62 | 82 | 4.79 | 1.50 |

The mechanical properties of the membranes in the wet state are always good; in a very dry state they tend to become somewhat brittle.

From the above-mentioned styrenized sheets (4, 9 and 12 of Table III) also positive membranes have been prepared by chloromethylating and aminating the sheets as indicated in Example 2. The chloromethylation took place with chloromethyl methylether +2.5% tintetrachloride. The temperature with the polyethylene (Ziegler) was 55° C., with the polypropylene (A/2 and M/2) it was 58-50° C. Aminating was effected in trimethylamine (25%) plus water (75%) at 20° C.

After 6 hours with polyethylene the chloromethylation was at its maximum; for polypropylene the maximum was reached after 2 hours both for A/2 and M/2.

In Table V the results are given for the aminating step. Here it is the nitrogen content which is a measure of the degree of conversion and again (as in Table IV for the sulphur content) the results are given in percent and in milliequivalents. Ohmic resistance is again given in 0.1 N NaCl; selectivity in 1 N/2 N KCl as usual. The water content is in percent.

TABLE V

| Type polyalkylene | Duration amination in hours | Ohmic resistance | Selectivity | H₂O | N, percent | N, meq. |
|---|---|---|---|---|---|---|
| Ziegler | 48 | 47 | 90 | 12.3 | 1.47 | 1.05 |
| A/2 | 24 | 9.0 | 96 | 20.0 | 1.81 | 1.29 |
| M/2 | 24 | 7.0 | 93 | 38.8 | 2.32 | 1.66 |

Both the membranes on polyethylene base and those on polypropylene base had a good mechanical strength.

The positive membranes on a base of polypropylene were much less brittle in a very dry state than the negative membranes on a polypropylene base in a very dry state.

As indicated, chloromethylation can also be carried out by keeping the styrenized sheet in chloromethyl methylether vapour instead of in the liquid. In Table VI some results are given obtained with styrenized high-pressure polyethylene (27% polystyrene; the monomeric styrene containing 2% divinylbenzene). As catalysts were used tin tetrachloride (1.0 and 2.5 and 5.0% SnCl₄ calculated on the other chloromethyl methylether) and titanium tetrachloride (3.65% of which is equivalent to 5% SnCl₄). The chlorine-content is a measure for the degree of conversion. Amination was carried out with aqueous trimethylamine (25% amine+75% H₂O) for 24 hours at room temperature. Here again N% and N meq. have been given as in Table V.

TABLE VI

| Catalyst | Time in vapour in hours | Percent Cl | Resistance, ohms, 0.1 N NaCl | H₂O | N, percent | N, meq. |
|---|---|---|---|---|---|---|
| 1% SnCl₄ | 0.5 | 5.0 | 10.5 | 18.8 | 1.84 | 1.31 |
|  | 1 | 5.8 | 9.0 | 21.2 | 2.00 | 1.43 |
|  | 1.5 | 6.3 | 9.3 | 21.6 | 2.21 | 1.58 |
|  | 2 | 6.5 | 9.0 | 20.7 | 2.18 | 1.56 |
| 2.5% SnCl₄ | 0.5 | 5.1 | 12.0 | 18.8 | 1.81 | 1.29 |
|  | 1 | 6.6 | 9.3 | 20.7 | 2.29 | 1.64 |
|  | 1.5 | 6.9 | 11.4 | 19.8 | 2.32 | 1.66 |
|  | 2 | 6.8 | 10.2 | 19.2 | 2.32 | 1.66 |
| 5% SnCl₄ | 0.5 | 7.6 | 18 | 15.9 | 2.19 | 1.56 |
|  | 1 | 8.0 | 12 | 18.1 | 2.28 | 1.63 |
|  | 1.5 | 8.4 | 17.7 | 19.3 | 2.42 | 1.73 |
| 3.65% TiCl₄ | 3 | 2.8 | 44.8 | 15.0 | 1.37 | 0.98 |
|  | 6 | 5.3 | 10.0 | 21.3 | 2.08 | 1.49 |

The selectivity (1 N/2 N Kcl) is good. With 1% SnCl₄ and 0.5 hour chloromethylation, a selectivity of 90% was obtained after amination.

Chloromethylation in vapour takes less time than in liquid. With 2.5% SnCl₄ after 6 hours a chlorine percentage of 5.0% was reached in liquid; in vapour after 0.5 hour already a chlorine percentage of the same magnitude (5.1%) was found.

The mechanical properties of the membranes listed in Table VI were very good.

Also with "Moplen A/2" and "M/2" experiments with chloromethylation in chloromethyl methyl ether vapour instead of liquid have been carried out but here no appreciable differences have been noted in comparison with the experiments recorded in Table V regarding the duration of the chloromethylating step; this is probably due to the fact that in Table V chloromethylation in liquid with polypropylenes was completed already after 2 hours, whereas the chloromethylation of the Ziegler base product listed in Table V took about 4-6 hours in liquid ether. On the other hand it is also possible to chloromethylate a Ziegler base product in liquid phase within a short time.

Amination can be done not only with trimethylamine but also with other amines. In Table VII some cases are recorded. The starting material was styrenized (sidac) polyethylene with $P_1 = 31.7\%$. This value shows that it is easy to obtain highly styrenized products; the values listed in Table III are much lower, showing that there is no difficulty to produce a wide range of polystyrene contents. During the previous swelling step in the monomeric styrene 2% by weight of divinyl benzene were dissolved. Chloromethylation took place in Cl CH₂OCH₃ (liquid) with 5% SnCl₄ for 1.5 hours at 55° C. Chlorine analysis 4.95% Cl. The sign (?) means that no value was determined.

TABLE VII

| Temperature amination, °C. | Time amination, hours | Amine | Ohmic resistance, 0.1 N NaCl | Selectivity, 1N/2N KCl | H₂O, Percent | N, Percent | N, meq. |
|---|---|---|---|---|---|---|---|
| 20 | 4 | Trimethylamine (25%)+ water (75%). | 6.6 | 83 | 24.6 | 2.14 | 1.53 |
| 20 | 8 | | .12 | 82 | 18.1 | 1.59 | 1.14 |
| 20 | 12 | | 11.8 | 76 | 17.4 | 1.62 | 1.16 |
| 20 | 16 | | 9 | 80 | 20.6 | 1.90 | 1.36 |
| 20 | 24 | | 13.2 | 81 | 20.0 | 1.98 | 1.41 |
| 50 | 1 | Triethylamine (80%)+water (20%); suspension. | 17.4 | 80 | 25.6 | 1.23 | 0.88 |
| 50 | 2 | | 16.0 | 75 | 32.1 | 1.58 | 1.13 |
| 50 | 3 | | 14.8 | 79 | 27.5 | 1.93 | 1.38 |
| 50 | 1 | Pyridine; pure | 13.6 | 80 | 18.1 | 1.30 | 0.93 |
| 50 | 2 | | 10.0 | 80 | 21.0 | 1.37 | 0.98 |
| 50 | 3 | | 7.6 | (¹) | 22.5 | 1.16 | 0.83 |
| 50 | 4 | | 6.6 | (¹) | 22.7 | 11.1 | 0.79 |
| 50 | 1 | Pyridine (50%) + water (50%). | 8.3 | 80 | 23.3 | 1.10 | 0.79 |
| 50 | 2 | | 6.0 | 80 | 26.7 | 1.04 | 0.74 |
| 50 | 3 | | 4.7 | (¹) | 28.3 | 1.18 | 0.84 |
| 50 | 4 | | 6.3 | (¹) | 26.8 | 1.06 | 0.76 |
| 50 | 2 | N-N-dimethylamino ethanol; pure. | 15.1 | 83 | 26.7 | 2.11 | 1.50 |
| 50 | 3 | | 11.5 | 85 | 26.0 | 2.08 | 1.48 |
| 50 | 4 | | 10.9 | 85 | 26.5 | 2.04 | 1.46 |
| 50 | 2 | N-N-dimethylamino ethanol (50%) + water (50%). | 9.2 | 85 | 27.4 | 1.99 | 1.42 |
| 50 | 3 | | 10.1 | 85 | .28.0 | 2.14 | 1.53 |
| 50 | 4 | | 9.5 | 85 | 27.9 | 2.13 | 1.52 |

In some cases the nitrogen content given in Table VII is somewhat higher than could be expected. This is due to the difficulty of removing the non-converted amine completely from the membrane.

The mechanical properties of the membranes were good to excellent.

It is possible to use also other aminating liquids such as pure dimethylaniline and pure triethylamine but the ohmic resistance was found to be rather high for practical purposes. With pure triethylamine for instance at a temperature of 50° C. and 2 hours treatment a resistance of 26.0 ohms was found.

The sulphonated membranes can be improved considerably by treating them with bleaching lye. In general by this treatment their ohmic resistance is reduced to about half their initial value. Neither the composition of the bleaching lye nor the temperature or the duration of the treatment are very critical. With a given sulphonated membrane having an ohmic resistance of 12 ohms/sq. cm. and a selectivity in 1 N/2 N KCl of 88 after a treatment of 24 hours with bleaching lye (20% NaOH; 12% active chlorine) at room temperature an electric resistance of 6 ohms/cm.² was found. In another case the resistance of a sulphonated membrane of 24 ohms (which is rather high for practical purposes) could be reduced to 12 ohms by treating it for 3 hours at room temperature with bleaching lye (5% active chlorine). Generally the capacity of the membrane is somewhat increased by the treatment (by about 20%), the selectivity is somewhat decreased (by about 20%).

A great advantage of the process according to the invention is that not only negative membranes of good quality may be obtained but also positive membranes with surprisingly good electrical and mechanical properties which is of great practical importance.

If a cross-linking agent such as divinyl benzene is used in the swelling and in the polymerizating stage its function seems to be that a homogeneous film is obtained which film remains homogeneous after ionic groups have been introduced and that the membrane is insoluble in water or electrolyte solutions. The content of cross-linking agent does not substantially influence the degree of polymerization but it influences the water content of the membranes.

The new products are a very suitable starting material for the process indicated in the first paragraphs namely introducing ionic groups in the organic high-molecular hydrophobic material and so forming selective membranes. Some of these processes have been described in the British patent specification No. 778,001. They include introducing of quaternary ammonium, guanidinium and pyridinium groups and tertiary sulphonium groups. This can be done by first introducing halogen atoms in the sheet e.g. by chloromethylation and then reacting with amines, pyridines, guanidines such as pentamethyl-guanidine dissolved e.g. in acetone, with sodium amide in liquid ammonia, with dimethylsulphide e.g. dissolved in benzylalcohol or acetone etc. In an analoguous way phosphonium groups may be introduced. Sulphonation can be done with sulphuric acid, a mixture of sulphuric acid and sulphur trioxide, chlorosulphonic acid, etc. In an analoguous way phosphoric acid groups may be introduced.

In general the ionic groups must be of such a type that their dissociation constant is at least $10^{-5}$; by the term "dissociation constant of an ionic group" is meant the dissociation constant of the compound in which the ionic group is attached to a lower alkyl group. The amount of ionic groups in a membrane is expressed in milliequivalents per gram of dry membrane; for practical purposes the value should exceed 0.15 meq./g. of dry membrane.

Probably the products according to the invention consist of an autonomous matrix of e.g. polystyrene loosely lying in the polyalkene.

The excellent mechanical properties of the membranes (substantially equal to those of the polyalkylene) are ascribed to the polyalkylene component and the excellent electrical and electrochemical properties are ascribed to the fact that the ionic groups can be attached easily to the aromatic component for instance to the polystyrene component.

The membranes combine the good properties of both initial components. The mechanical properties of e.g. polystyrene are quite unsuitable for membranes and on the other hand the conversion of pure polyalkylenes to membranes is difficult to achieve; if for instance polyethylene is sulphonated there is always a moment that the polyethylene film swells enormously in the sulphonation bath, at which moment the film is mechanically so weak that it can scarcely be handled. No such difficulties arise with the p.oducts according to the invention.

If monomeric styrene is used as a swelling agent it need not be chemically pure. Technical styrene and mixtures such as styrene and methylstyrene may be used as well and the term styrene should be understood to cover also these products.

This is a continuation of S.N. 738,019 filed May 27, 1958, now abandoned.

What is claimed is:

1. The process for the production of ion exchange membranes which comprises contacting a vinyl aromatic monomer with a solid carrier polymer until the monomer is absorbed therein, polymerizing said monomer within said polymer by thermal treatment above room temperature and below the softening temperature of the carrier polymer in the presence of a free radical producing polymerization catalyst and thereafter introducing ion exchange groups into the polymerized monomer.

2. The process according to claim 1 wherein the carrier polymer is shaped into a film.

3. The process according to claim 1 wherein polymerization occurs in a confined space.

4. The process according to claim 1 wherein the polymerization catalyst is selected from the group consisting of benzoyl peroxide and N,N-azo-bis-isobutyro nitrile.

5. The process according to claim 1 wherein the polymerized vinyl aromatic monomer is cross linked.

6. The process according to claim 5 wherein cross linking is conducted with divinyl benzene.

7. The process according to claim 1 wherein the carrier polymer is polyethylene and styrene is polymerized and sulfonated.

8. A process of converting a polyalkylene selected from the group consisting of polyethylene and polypropylene into a homogeneous ion exchange material comprising an autonomous continuous matrix of a polymerized vinyl aromatic compound containing chemically attached ionic groups supported within and crosslinked through said polyalkylene, said ionic groups being present in an amount of at least 0.15 milliequivalents per gram of dry substance and having a dissociation constant of at least $10^{-5}$, which comprises the steps of swelling said polyalkylene with a liquid monomeric vinyl aromatic compound, polymerizing said swollen polyalkylene product containing said monomeric vinyl aromatic compound by heating above room temperature and below the softening temperature of the polyalkylene and thereafter attaching ionic groups to the product.

9. The process of claim 8 wherein a polymerization catalyst is dissolved in said monomeric vinyl aromatic compound.

10. The process of claim 8, wherein a cross-linking agent is dissolved in said monomeric vinyl aromatic compound.

11. A process of converting polyethylene into ion exchange material consisting of an autonomous continuous matrix of polymerized styrene containing quaternary ammonium groups supported on and crosslinked through continuous polyethylene material, said quarternary ammonium groups being present in an amount of at least 0.15 milliequivalent per gram of dry substance and having a dissociation constant of at least $10^{-5}$, which comprises the steps of swelling said polyethylene with liquid monomeric styrene, polymerizing said swollen polyethylene containing monomeric styrene by heating to a temperature between 60 and 110° C. reacting the polymerized styrene contained in the polyethylene matrix with chloromethyl methylether under chloromethylating conditions, and reacting the polymerized chloromethylated styrene contained in the polyethylene matrix with a tertiary nitrogen compound under quaternizing conditions to recover said ion exchange material.

12. The process of claim 11 wherein a cross-linking agent is dissolved in said liquid monomeric styrene.

13. A process of converting polyethylene into ion exchange material consisting of an autonomous continuous matrix of polymerized styrene containing sulfo-groups supported on and crosslinked through polyethylene, said sulfo-groups being present in an amount of at least 0.15 milliequivalents per gram of dry substance and having a dissociation constant of at least $10^{-5}$, which comprises the steps of swelling said polyethylene with liquid monomeric styrene, polymerizing said swollen polyethylene containing monomeric styrene by heating to a temperature between 60 and 100° C. in reacting the polymerized styrene contained in the polyethylene matrix with a sulfonating agent selected from the group consisting of chlorosulfonic acid, oleum and sulfuric acid at temperatures up to 100° C. and recovering said ion exchange material.

14. The process of claim 13, wherein the sulfonation step is conducted with chlorosulfonic acid at room temperature.

15. The process of claim 13, wherein the sulfonation step is conducted with sulfuric acid at elevated temperatures.

16. The process of claim 15, wherein a silver nitrate catalyst is dissolved in the sulfuric acid.

17. The process of claim 13, wherein a cross-linking agent is dissolved in said liquid monomeric styrene.

18. In a process for the production of ion exchange material which comprises imbibing a liquid vinyl aromatic monomer within a solid carrier polymer and polymerizing said monomer within said polymer at a temperature above room temperature and below the softening temperature of the carrier polymer in the presence of a free radical generating catalyst to form a polymeric product, the step of the thereafter introducing ion exchange groups into said polymeric product.

19. A process according to claim 18 wherein the carrier polymer is polypropylene.

20. A process according to claim 18 wherein the carrier polymer is polyethylene.

21. A process according to claim 18 wherein the liquid monomer is styrene.

22. A process according to claim 18 wherein the liquid monomer is vinyl toluene.

23. A process according to claim 18 wherein the carrier polymer is formed into a shaped product.

24. A product made by the method of claim 1.

25. A product made by the method of claim 8.

26. A product made by the method of claim 11.

27. A product made by the method of claim 13.

28. A product made by the method of claim 18.

29. The method of segregating ions in a fluid which comprises contacting said fluid with material made by the method of claim 18.

References Cited in the file of this patent

UNITED STATES PATENTS

| 2,834,746 | Salyer | May 13, 1958 |
|---|---|---|
| 2,837,496 | Vandenberg | June 3, 1958 |
| 2,965,697 | Duddy | Dec. 20, 1960 |

OTHER REFERENCES

Chen et al.: J. Polymer Science, volume 23, pages 903–913 (February 1957).